J. R. BAIRD.
Carriage Wheel.
No. 100,584.  Patented March 8, 1870.
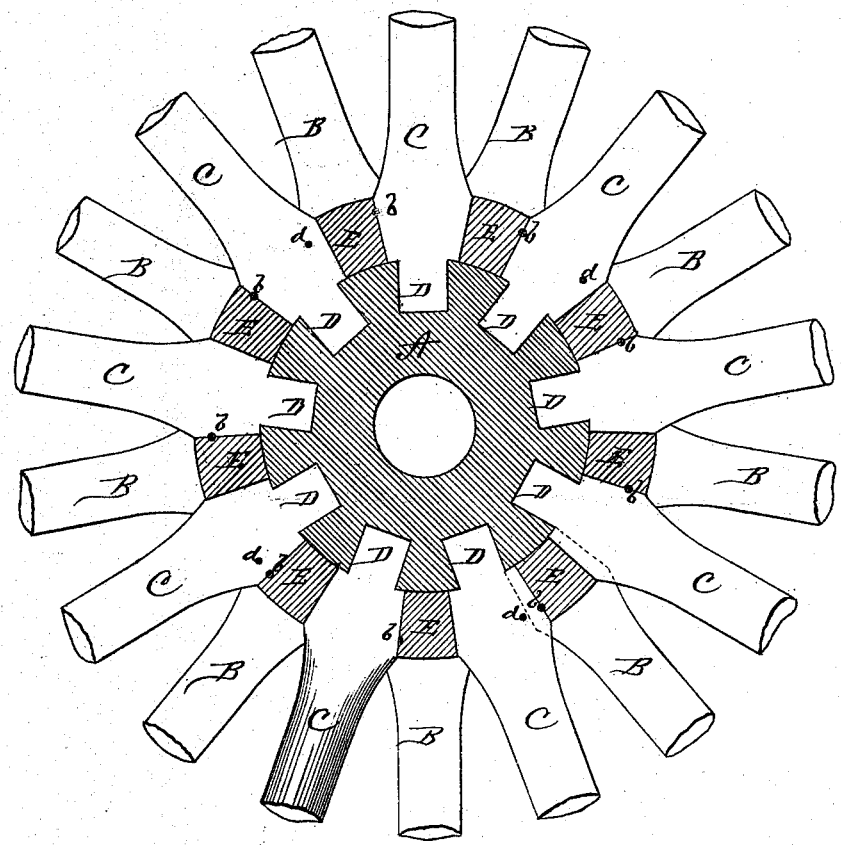
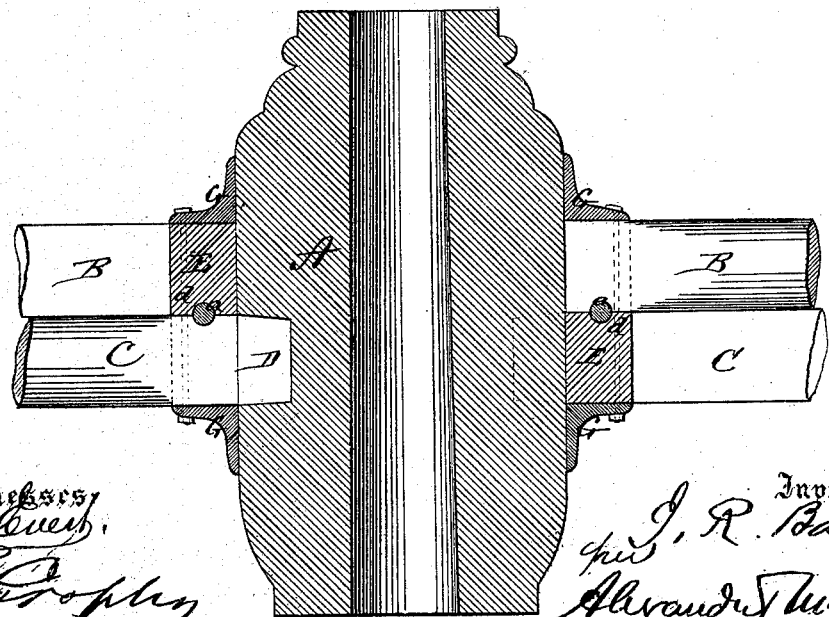
Witnesses:  Inventor:

United States Patent Office.

JAMES R. BAIRD, OF VINCENNES, INDIANA.

Letters Patent No. 100,584, dated March 8, 1870.

IMPROVEMENT IN CARRIAGE-WHEELS.

The Schedule referred to in these Letters Patent and making part of the same.

*To all whom it may concern:*

Be it known that I, JAMES R. BAIRD, of Vincennes, in the county of Knox, and in the State of Indiana, have invented certain new and useful Improvements in Wheels; and do hereby declare that the following is a full, clear, and exact description thereof, reference being had to the accompanying drawings and to the letters of reference marked thereon, making a part of this specification.

My invention relates to that class of wheels known as the staggered spoke-wheel; and It consists—

First, in the application of a wire dowel-ring, which forms a circuit entirely around the hub, and between the front and back spokes, and Second, in wedge-blocks, which are inserted between the spokes, and rest upon the surface of the hub, said blocks being firmly secured by wire dowels or pins inserted between the blocks and spokes, which assist in confining the blocks, the whole being firmly secured by flange bands.

In order to enable others skilled in the art to which my invention appertains to make and use the same, I will now proceed to describe its construction and operation, referring to the annexed drawings, in which—

Figure 1 is a vertical section, showing the wheel, with the back end of the hub removed, and Figure 2 is a horizontal section.

A represents the hub of the wheel;

B B are the front spokes; and

C C, the back spokes.

Between the front and back spokes is inserted a wire dowel-ring, $a$, which forms a circuit entirely around the hub, and binds the spokes firmly.

The rear spokes C C are provided with tenons D D, inserted in mortises in the hub, and between said spokes are inserted wedge-blocks E E, which are secured by means of dowel-pins or wires $b\ b$, inserted between the spoke and the block, to confine the blocks in their places.

The front spokes B B have no tenons, but rest on the surface of the hub.

Between these spokes are also placed similar wedge-blocks, secured in like manner by means of dowel-pins or wires.

On both the front and back sides of the hub are placed circular wrought-iron flanges G G, which are forced on to the hub against the spokes, and secured by bolts or rivets $d\ d$, passing through the spokes and both flanges, thus securing and binding the whole firmly together.

Having thus fully described my invention,

What I claim as new, and desire to secure by Letters Patent, is—

1. In a staggered-spoke wheel, a wire dowel-ring, inserted between the front and back spokes, forming a circuit around the hub, substantially as herein set forth.

2. The arrangement of two series of spokes in a wheel, when one series is provided with tenons, inserted in mortises in the hub, and the other series have no tenons, but rest on the surface of the hub, substantially as herein set forth.

3. The combination of the hub A, front spokes B B, back spokes C C, with their tenons D D, wire dowel-ring $a$, wedge-blocks E E, dowel-pins or wires $b\ b$, flanged bands G G, and bolts or rivets $d\ d$, all constructed and arranged substantially as shown and described.

In testimony that I claim the foregoing, I have hereunto set my hand this 27th day of January, 1870.

J. R. BAIRD.

Witnesses:
W. N. DeWOLF,
M. D. LACROIX.